(12) United States Patent
Julka et al.

(10) Patent No.: US 8,571,481 B2
(45) Date of Patent: Oct. 29, 2013

(54) SYSTEM AND METHOD FOR SUPPORTING A KEEP ALIVE MECHANISM IN A WIRELESS COMMUNICATIONS SYSTEM

(75) Inventors: Vibhor Julka, San Diego, CA (US); Zhixian Xiang, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 572 days.

(21) Appl. No.: 12/760,346

(22) Filed: Apr. 14, 2010

(65) Prior Publication Data

US 2010/0267342 A1  Oct. 21, 2010

Related U.S. Application Data

(60) Provisional application No. 61/169,533, filed on Apr. 15, 2009.

(51) Int. Cl.
*H04B 1/00* (2006.01)
*H04B 15/00* (2006.01)

(52) U.S. Cl.
USPC ......................... 455/63.1; 455/574

(58) Field of Classification Search
USPC .............................. 455/63.1, 574
See application file for complete search history.

(56) References Cited

U.S. PATENT DOCUMENTS

| | | | | |
|---|---|---|---|---|
| 7,373,146 | B2 * | 5/2008 | Kong et al. | 455/426.1 |
| 7,672,264 | B2 * | 3/2010 | Babin | 370/318 |
| 7,885,616 | B2 * | 2/2011 | Plestid et al. | 455/91 |
| 8,260,372 | B2 * | 9/2012 | Haumont | 455/574 |
| 2007/0058599 | A1 | 3/2007 | Harsch | |
| 2007/0189205 | A1 * | 8/2007 | Terry et al. | 370/328 |
| 2008/0039032 | A1 | 2/2008 | Haumont | |
| 2008/0045277 | A1 | 2/2008 | Plestid et al. | |
| 2009/0201857 | A1 * | 8/2009 | Daudin et al. | 370/328 |
| 2009/0207805 | A1 * | 8/2009 | Zou | 370/331 |
| 2009/0271517 | A1 * | 10/2009 | Naylor et al. | 709/227 |

FOREIGN PATENT DOCUMENTS

WO  WO 2007/069046 A1  6/2007
WO  WO 2008/121040 A1  10/2008

OTHER PUBLICATIONS

Office Action and partial translation received in Chinese Application No. 201080015456.5, dated Apr. 11, 2013, 12 pages.
"International Search Report and Written Opinion," International Application No. PCT/CN2010/071797, Applicant: Huawei Technologies Co., Ltd., et al., mailing date: Jul. 22, 2010, 9 pages.

\* cited by examiner

*Primary Examiner* — Ping Hsieh
*Assistant Examiner* — Chung-Tien Yang
(74) *Attorney, Agent, or Firm* — Slater & Matsil, L.L.P.

(57) ABSTRACT

A system and method for supporting a keep alive mechanism in a wireless communications system are provided. A method for communications device operation includes if the communications device is operating within an idle time window and if the communications device is in the idle state, initiating a keep alive procedure, and if the communications device is not operating within the idle time window and if an elapsed time since a last transmission by the communications device is greater than an upper boundary of the idle time window, initiating the keep alive procedure. The method further includes if the communications device is not operating within the idle time window and if the elapsed time since the last transmission by the communications device is less than a lower boundary of the idle time window, not initiating the keep alive procedure.

25 Claims, 6 Drawing Sheets

SYSTEM AND METHOD FOR SUPPORTING A KEEP ALIVE MECHANISM IN A WIRELESS COMMUNICATIONS SYSTEM

This application claims the benefit of U.S. Provisional Application No. 61/169,533, filed on Apr. 15, 2009, entitled "System and Method for Supporting a KeepAlive Mechanism in a Wireless Communications System," which application is hereby incorporated herein by reference.

TECHNICAL FIELD

The present invention relates generally to wireless communications, and more particularly to a system and method for supporting a keep alive mechanism in a wireless communications system.

BACKGROUND

As wireless communications systems continue to evolve and improve, it may be common for a service area to be served by multiple wireless communications systems as service providers upgrade equipment while keeping older equipment operational for compatibility purposes. In order to maximize user equipment (UE) flexibility, UE may be operable in the multiple wireless communications systems. These UEs may be referred to as hybrid devices.

In general, there may be several different classes of hybrid devices. For example, there may be two transmit antennas/two receive antennas (2 Tx/2 Rx) hybrid devices that may be capable of simultaneous uplink/downlink communications with two wireless communications systems, while a one transmit antenna/two receive antennas (1 Tx/2 Rx) hybrid devices may be capable of simultaneous reception with two wireless communications systems but can only transmit with one wireless communications system and a one transmit antenna/one receive antennas (1 Tx/1 Rx) hybrid devices may be capable of communicating with one wireless communications system at any given time.

When operating in an area served by multiple wireless communications systems, a hybrid device may be capable of simultaneously establishing data sessions with the multiple wireless communications systems. However, in order to maintain each of the sessions with the multiple wireless communications systems, the hybrid device may be required to periodically make a transmission in a corresponding wireless communications system to keep the session active, also commonly referred to as keeping the connection alive.

SUMMARY

These technical advantages are generally achieved, by embodiments of a system and method for supporting a keep alive mechanism in a wireless communications system.

In accordance with an embodiment, a method for communications device operation is provided. The method includes determining if a communications device is operating within an idle time window, and determining if the communications device is in an idle state. The idle time window is specified by a first time and a second time, and the second time is greater than or equal to the first time. The method further includes if the communications device is operating within the idle time window and if the communications device is in the idle state, initiating a keep alive procedure, as well as if the communications device is not operating within the idle time window and if an elapsed time since a last transmission by the communications device is greater than the second time, initiating the keep alive procedure. The method also includes if the communications device is not operating within the idle time window and if the elapsed time since the last transmission by the communications device is less than the first time, not initiating the keep alive procedure.

In accordance with another embodiment, a method for communications device operation is provided. The method includes updating a timer that maintains an elapsed time since a last transmission by a communications device, determining if the communications device is operating in a first priority state, and if the communications device is operating in the first priority state and if the communications device is in an idle state, initiating a keep alive procedure. The method also includes determining if the communications device is operating in a second priority state, and if the communications device is operating in the second priority state, initiating the keep alive procedure.

In accordance with another embodiment, a communications device is provided. The communications device includes a receiver coupled to an antenna, a transmitter coupled to the antenna, a timer, and a controller coupled to the receiver, to the transmitter, and to the timer. The receiver receives signals detected by the antenna, the transmitter transmits signals using the antenna, and the timer measures elapsed time. The controller initiates a communications device initiated keep alive procedure based on an elapsed time measured by the timer. The communications device initiated keep alive procedure keeps an alternate session with an alternate communications system alive while the communications device is in a current session with a current communications system.

An advantage of an embodiment is that a single communications device, while camped in a first access network, maintain a session in a second access network.

A further advantage of an embodiment is that thresholds may be used to tune the maintenance of sessions in both the first access network and the second access network to meet desired or expected user experience.

Yet another advantage of an embodiment is that the use of thresholds may control the behavior of the communications device, and trades-off user experience and overhead.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 2 is a diagram of a UE/AT;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a communications device with a first session in a first access network, such as the Third Generation Partnership Project (3GPP) Long Term Evolution (LTE), and a second session in a second access network, such as high rate packet data (HRPD). The invention may also be applied, however, to communications devices with sessions in other access networks, such as LTE-Advanced, enhanced HRPD (eHRPD), WiMAX, WiFi, CDMA, and so forth.

Figure 1:
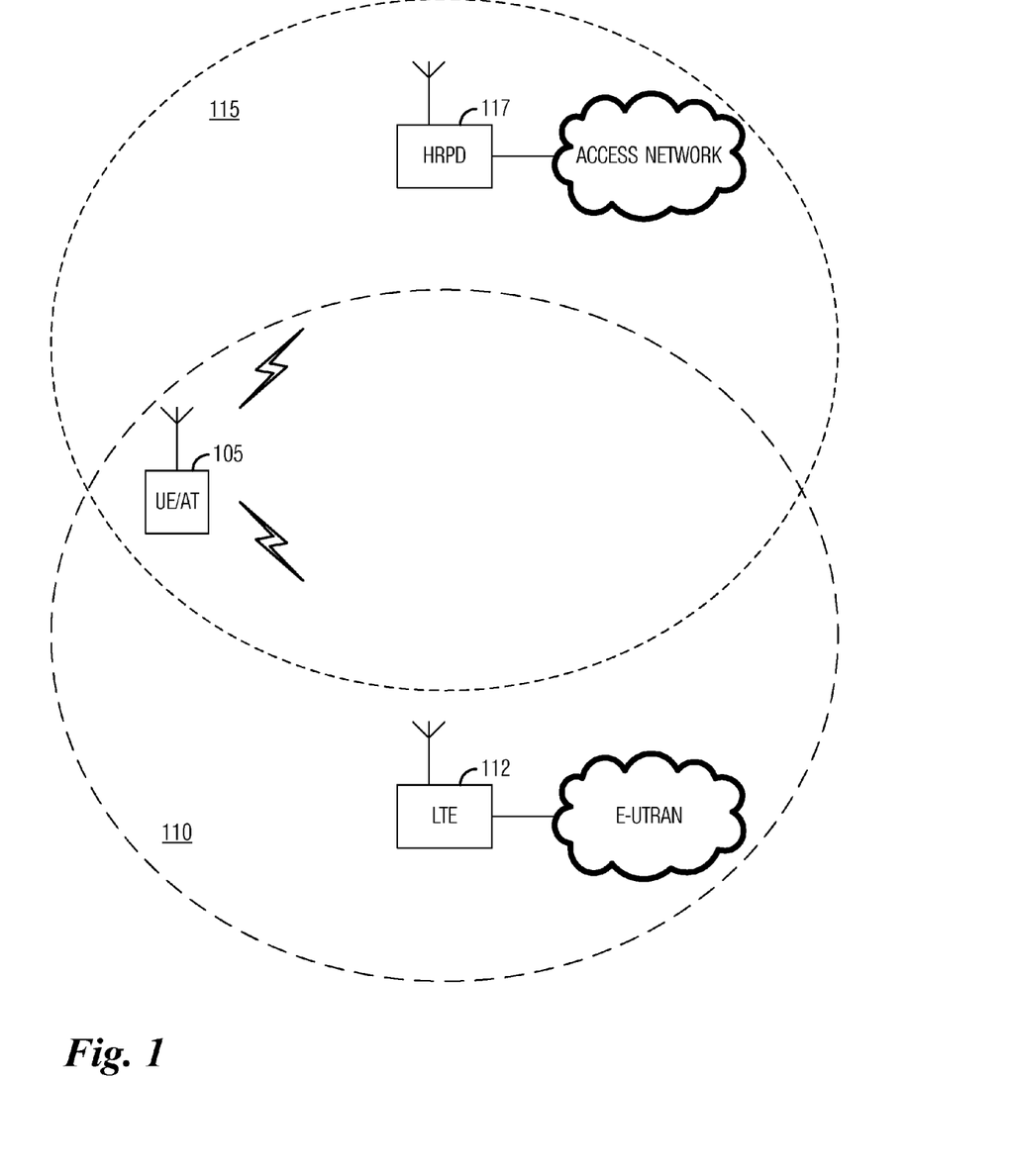
FIG. 1 is a diagram of a hybrid device in an operating environment.

FIG. 1 illustrates a hybrid device 105 in an operating environment. Hybrid device 105 may be capable of operating in a Long Term Evolution (LTE) wireless communications network (shown as coverage area 110 and controlled by a LTE base station 112) and a HRPD wireless communications network (shown as coverage area 115 controlled by an HRPD base transceiver station 117).

As discussed previously, when operating in an area served by multiple wireless communications systems, a hybrid device may be capable of simultaneously establishing data sessions with the multiple wireless communications systems. However, in order to maintain each of the sessions with the multiple wireless communications systems, the hybrid device may be required to periodically make a transmission in a corresponding wireless communications system to keep the session active, also commonly referred to as keeping the connection alive, especially when one of the connections is not actively transmitting or receiving information.

For example, a hybrid device (a UE/access terminal (AT)) compatible with both 3GPP LTE and HRPD wireless communications systems may perform registration in the HRPD wireless communications system and establishes an HRPD session. The HRPD session needs to be maintained by both an Access Network (AN) and the UE/AT. To provide support for maintaining the session, a keep alive procedure is specified in 3GPP2 technical specifications A.S0024 whereby in the absence of any activity (e.g., uplink (UL)/downlink (DL) message exchange), the UE/AT or the AN may send an explicit KeepAliveRequest message to solicit a response from its peer. The action of the KeepAliveRequest message and a corresponding response keeps an inactive connection alive.

In particular, with an AN initiated keep alive procedure, the AN sends a KeepAliveRequest message to the UE/AT if the AN detects a period of inactivity at the UE/AT of at least $T_{SMPClose}/N_{SMPKeepAlive}$ minutes, where $T_{SMPClose}$ is a time value and $N_{SMPKeepAlive}$ is a number. The AN then expects the UE/AT to respond with a KeepAliveResponse message. If the UE/AT does not receive the KeepAliveRequest message, then it will not be able to respond. The AN may send up to ($N_{SMPKeepAlive}-1$) KeepAliveRequest messages without receiving a response from the UE/AT. However, if the AN does not receive a response upon sending the $N_{SMPKeepAlive}$-th KeepAliveRequest message (corresponding to an inactivity period of $T_{SMPClose}$ minutes), then the AN may perform a session close (i.e., terminate the HRPD session) associated with the UE/AT.

However, if the UE/AT is a 1 Rx/1 Tx hybrid device, it will be able to listen to only the UL/DL of one wireless communications system at a time, either LTE or HRPD, for example. In an LTE-HRPD interworking solution, if the UE/AT with the single/receive/transmit antenna is currently monitoring the LTE wireless communications system (while in either an idle or active state), the UE/AT will not be able to monitor HRPD transmissions and will not be aware of any incoming KeepAliveRequest messages (AN initiated keep alive procedures).

Therefore, the UE/AT will not be able to send a corresponding KeepAliveResponse message. The inability of the UE/AT to detect incoming KeepAliveRequest messages and therefore not sending corresponding KeepAliveResponse messages may lead to the AN deleting the HRPD session as described previously. If the AN deletes the HRPD session, the UE/AT would have to re-establish an HRPD session upon eventually performing a hand-off from the LTE wireless communications system to the HRPD wireless communications system. The need to re-establish an HRPD session may result in poor performance (packet loss) and a poor user experience.

In order to address the termination of an inactive session problem, the UE/AT needs to ensure that prior to a session being deleted by the AN due to inactivity, the UE/AT needs to respond to the KeepAliveRequest message. One method to achieve the UE/AT responding to the KeepAliveRequest message is to have the UE/AT tune to the HPRD wireless communications system at designated times, e.g., at periodic intervals or specified times, when the UE/AT thinks that the AN would send a KeepAliveRequest message and then respond back with a corresponding KeepAliveResponse message.

However, the tuning to the eHRPD wireless communications system at designated times as initiated by an AN initiated keep alive procedure approach has several disadvantages including: (1) the AN may not have sent a KeepAliveRequest message at the designated time (the technical standards do not mandate that the AN send the KeepAliveRequest message after it detects inactivity of $T_{SMPClose}/N_{SMPKeepAlive}$ minutes), therefore the UE/AT may have tuned to the eHRPD wireless communications system for no benefit (while potentially negatively impacting LTE performance); (2) it is possible that the UE/AT may have changed eHRPD wireless communications system AN so that the UE/AT will tune to an incorrect BTS which will not be transmitting a KeepAliveRequest message for the UE/AT. Again, the UE/AT would have tuned to the eHRPD wireless communications system for no benefit.

Rather than addressing a means by which the UE/AT can receive the KeepAliveRequest message from the AN (an AN initiated keep alive procedure), embodiments discussed herein will address the UE/AT triggering the KeepAliveRequest message itself (i.e., a UE/AT initiated keep alive procedure).

A key observation is that regardless of the keepalive mechanism being initiated by the AN (e.g., the sending of KeepAliveRequest messages), a requirement set upon the UE/AT is that prior to an inactivity period of $T_{SMPClose}$ minutes the UE/AT will initiate a keep alive procedure and send a KeepAliveRequest message to the AN. Therefore, in an embodiment, the UE/AT is not concerned with tuning to the HRPD wireless communications system to receive a KeepAliveRequest message from the AN. Instead, the UE/AT will initiate a UE/AT initiated keep alive procedure by transmitting a KeepAliveRequest message to the AN.

Figure 2:
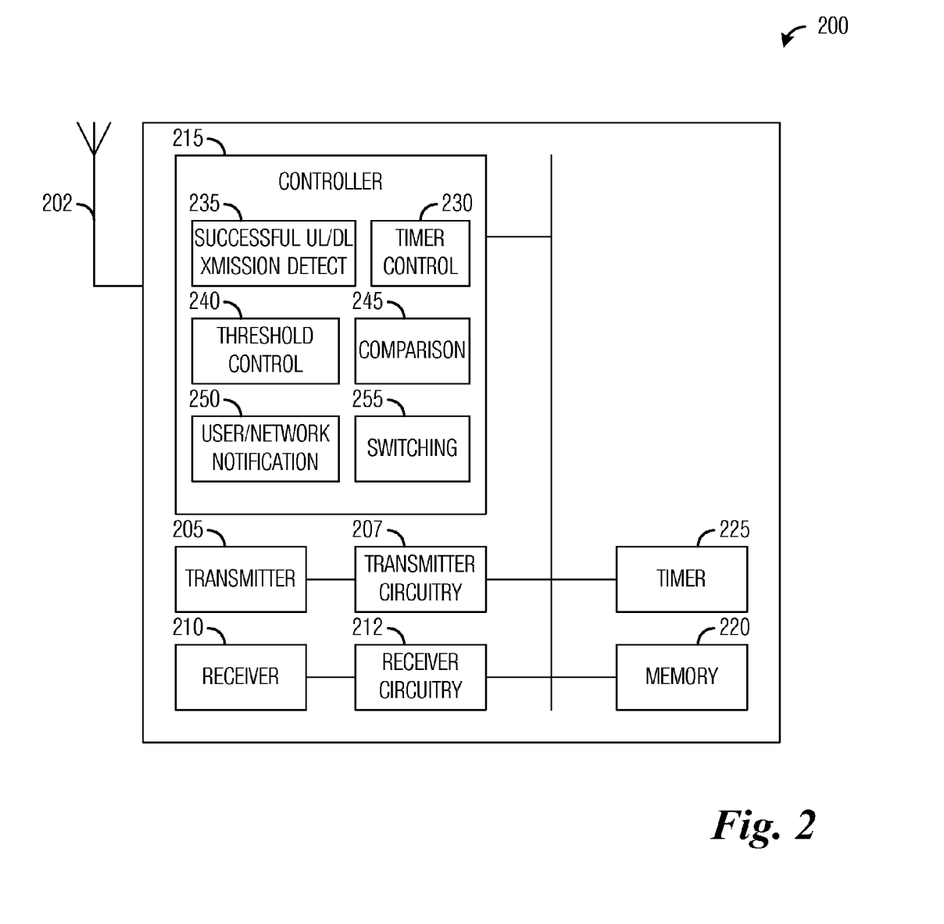

FIG. 2 illustrates a UE/AT 200. UE/AT 200 may be representative of a hybrid device capable of having simultaneous sessions in a plurality of wireless communications systems at a time. For example, UE/AT 200 may have simultaneous sessions in a LTE wireless communications system and an HRPD wireless communications system.

Although the discussion presented herein focuses on a UE/AT operating in an environment with a LTE wireless communications system and an HRPD wireless communications system, the embodiments are operable with other interworking situations, such as with LTE-Advanced, eHRPD, WiMAX, WiFi, CDMA, and so forth, compliant wireless communications systems. Therefore, the discussions should not be construed as being limiting to either the scope or the spirit of the embodiments.

UE/AT 200 may have at least one antenna 202. Antenna 202 may serve as both a transmit antenna and a receive antenna. Alternatively, UE/AT 200 may have separate transmit and receive antennas. According to an embodiment, UE/AT 200 as described herein has a single antenna operable as both transmit antenna and receive antenna. Coupled to antenna 202 may be a transmitter 205 used to transmit information over the air using antenna 202. Transmitter circuitry 207 coupled to transmitter 205 may provide signal processing for information being transmitted. Examples of signal processing provided by transmitter circuitry 207 may include filtering, amplifying, modulating, error encoding, parallel-to-serial converting, interleaving, bit puncturing, and so forth. Also coupled to antenna 202 may be a receiver 210 used to receive information detected by antenna 202. Receiver circuitry 212 coupled to receiver 210 may provide signal processing for received information. Examples of signal processing provided by receiver circuitry 212 may include filtering, amplifying, demodulating, error detecting and correcting, serial-to-parallel converting, de-interleaving, and so on.

A controller 215 may be a processing unit responsible for executing applications and programs, controlling operations of various components of UE/AT 200, interacting with a user of UE/AT 200, and so forth. In addition to the above listed operations, controller 215 may be responsible for keeping a session with a wireless communications system alive through the use of a UE/AT initiated keep alive procedure. To support controller 215 in keeping a session alive, UE/AT 200 also includes a memory 220 and a timer 225. Memory 220 may be used to store information used in the UE/AT initiated keep alive procedure, such as detection thresholds, timer values, AN identifier, and so forth. Timer 225 may be used to notify controller 215 when a specified amount of time has elapsed. For example, timer 225 may be initiated with a timer value stored in memory 220 and when a period of time substantially equal to the timer value has elapsed, timer 225 may notify controller 215, which may then take action in response to the elapsed time.

Controller 215 may include a timer control unit 230 that may be used to configure timer 225, for example, with timer values from memory 220. Timer control unit 230 may load timer 225 with different timer values depending on operations occurring in controller 215. Timer control unit 230 may also reset timer 225 based on a number of conditions, such as an occurrence of an event, a result of a comparison, and so on.

Controller 215 may also include a successful UL/DL transmission detect unit 235 that may be used to detect (or determine) a successful UL or DL transmission occurring in a particular wireless communications system. Successful UL/DL transmission detect unit 235 may be coupled to timer control 230. For example, successful UL/DL transmission detect unit 235 may detect a transmission (UL or DL) occurring in an HRPD wireless communications system and may output a signal based on the detected transmission. Successful UL/DL transmission detect unit 235 may output a signal at a first value if it has not detected a transmission and output the signal at a second value if it has detected a transmission. Output from successful UL/DL transmission detect unit 235 may be used by timer control 230 to initialize and/or reset timer 225.

Controller 215 may further include a threshold control unit 240. Threshold control unit 240 may specify threshold value(s) based on a desired behavior of controller 215 in initiating UE/AT initiated keep alive procedures. Threshold value(s) specified by threshold control unit 240 may be stored in memory 220. According to an alternative embodiment, rather than specifying threshold value(s), threshold control unit 240 may select from pre-specified threshold value(s) stored in memory 220. Selection of threshold value(s) may be based on desired behavior of controller 215.

According to an embodiment, thresholds may be used to control an initiation of a UE/AT initiated keep alive procedure. As an example, if a time elapsed since a last successful transmission has been detected in a first wireless communications system is greater than a first threshold, then controller 215 may initiate a UE/AT initiated keep alive procedure if UE/AT 200 is idle. In general, UE/AT 200 may be considered to be idle if UE/AT 200 is not actively communicating with another device in a wireless communications system to which it is tuned, e.g., the first wireless communications system. If UE/AT 200 has transmitted information or received information, UE/AT 200 may be considered to be not idle.

Furthermore, multiple thresholds may be utilized to prioritize the amount of time elapsed since the last successful transmission. For example, if the time elapsed since a last successful transmission has been detected in the first wireless communications system is greater than a second threshold, then controller 215 may initiate a UE/AT initiated keep alive procedure regardless of UE/AT 200 status.

Additional thresholds may be used in between the first threshold and the second threshold to capture extra priority levels and trigger a specific UE/AT and/or network behavior or response. The behavior or response may enable a smoother transition from the first wireless communications system to the second wireless communications system. For example, a third threshold may be used to request that an application of UE/AT 200 to suspend operations while UE/AT 200 may initiate the UE/AT initiated keep alive procedure for the first wireless communications system, where first threshold<third threshold<second threshold. However, it may not be possible to suspend all types of applications. As an example, in a time-critical application such as real-time multimedia, voice, or so forth, it may not be feasible for the application to allow itself to be suspended. However, in a non-time-critical application, such as a data transfer, or simple web-browsing, the application may allow itself to be suspended. If an application suitable for suspension is active when the third threshold is met, then UE/AT 200 may request that the application suspend itself and then UE/AT 200 may initiate the UE/AT initiated keep alive procedure. Furthermore, if the application is not suitable for suspension or if the application refuses to suspend itself, eventually, the second threshold may be met and UE/AT 200 may initiate the UE/AT initiated keep alive procedure without the application suspending itself.

Controller 215 may further include a comparison unit 245 that may be used to compare a value in timer 225 with threshold value(s) stored in memory 220. In addition to directly comparing the value in timer 225 with threshold value(s), comparison unit 245 may perform mathematical or logical operations prior to making the comparison. For example, comparison unit 245 may subtract the time elapsed since a last successful transmission has been detected in the first wireless communications system from a maximum allowed inactive time prior to performing the comparison with the threshold value(s).

Controller 215 may also include a user and/or network notification unit 250 that may be used to notify the user of UE/AT 200 that controller 215 may be initiating a UE/AT initiated keep alive procedure that may result in a termination of a session being used by the user. User and/or network notification unit 250 may prompt the user to determine if the user wishes controller 215 to proceed with initiating the UE/AT initiated keep alive procedure. Controller 215 may take appropriate action based on a response from the user. According to an alternative embodiment, instead of notifying and prompting the user, user and/or network notification unit 250 may notify the second wireless communications system that UE/AT 200 will be tuning into the first wireless communications system to perform the UE/AT initiate keep alive procedure. The second wireless communications system may stop further transmissions to or from UE/AT 200.

Controller 215 may additionally include a switching unit 255 that may be used to control the tuning of UE/AT 200 from the second wireless communications system to the first wireless communications system. Switching unit 255 may generate control signals to retune transmitter 205 as well as receiver 210 to the first wireless communications system. Switching unit 255 may access information stored in memory 220 related to the first wireless communications network, such as frequency band, AN identification information, and so forth.

Figure 3:
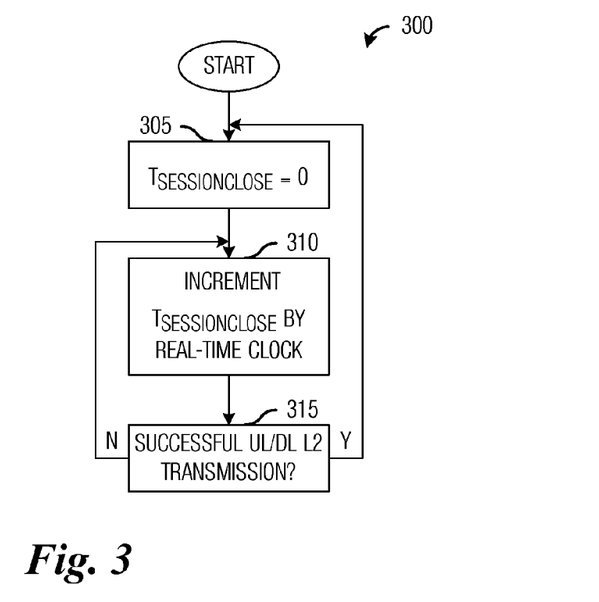
FIG. 3 is a flow diagram of UE/AT operations in supporting a UE/AT initiated keep alive mechanism.

FIG. 3 illustrates a flow diagram of UE/AT operations 300 in supporting a UE/AT initiated keep alive mechanism. UE/AT operations 300 may be indicative of operations taking place in a UE/AT, such as UE/AT 200, as the UE/AT operates in a normal operating mode with simultaneous sessions with a plurality of wireless communications systems.

The UE/AT may keep a timer, $T_{SessionClose}$ that may be used to keep track of elapsed time since a last transmission (UL or DL) in a wireless communications system. UE/AT operations 300 may begin with the UE/AT initializing (e.g., zeroing) the timer $T_{SessionClose}$ (block 305). After initializing, the timer $T_{SessionClose}$ may increment in real-time (block 310) and if the UE/AT successfully completes a DL/UL transmission exchange in the wireless communications system (the same wireless communications system as the AN) (block 315), the UE/AT may re-initialize the timer $T_{SessionClose}$. While if the UE/AT has not successfully completed a DL/UL transmission exchange in the wireless communications system, the timer $T_{SessionClose}$ may continue to increment in real-time.

According to an embodiment, the UE/AT is also configured with a value of $T_{SMPClose}$ (in minutes, for example), where $T_{SMPClose}$ may represent a duration of time after which an AN may close an inactive session. Furthermore, threshold values $\Delta_1$ and $\Delta_2$ are provided, wherein $\Delta_1 > \Delta_2$. Also, a variable $T_{MaxSessTime}$ may be defined a maximum duration of an inactive session and may be initialized to $T_{SMPClose}$. According to an embodiment, if the value of $T_{SMPClose}$ is not known a priori, then $T_{MaxSessTime}$ may be configured to a suitable/reasonable value less than $T_{SMPClose}$. In general, $T_{SMPClose}$ may be set to a value ranging from several hours up to 54 hours. A $T_{SMPClose}$ with too small a value may result in the UE/AT transmitting KeepAliveRequest messages more frequently, which may be undesirable, while too large a value may result in unused sessions being maintained and wasting network resources.

Figure 4:
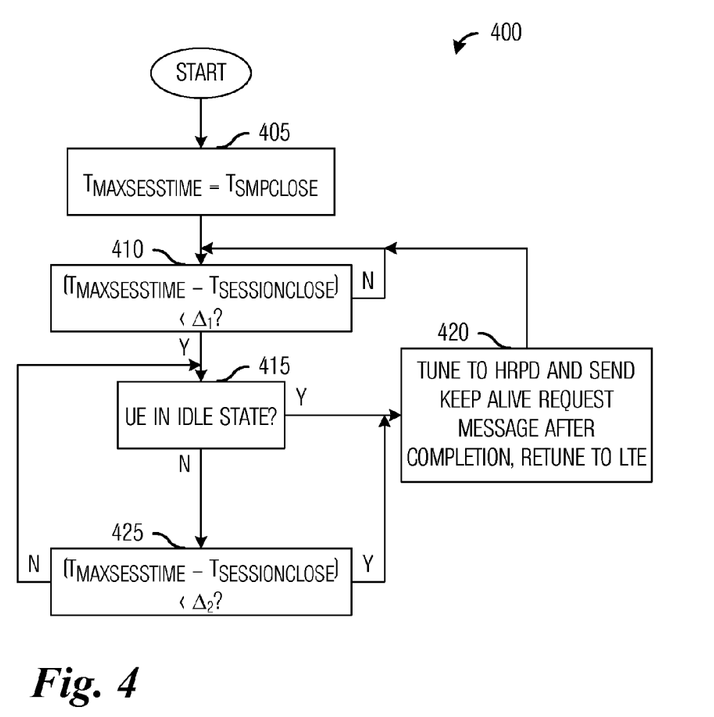
FIG. 4 is a flow diagram of UE/AT operations in supporting a keep alive mechanism.

FIG. 4 illustrates a flow diagram of UE/AT operations 400 in supporting a keep alive mechanism. UE/AT operations 400 may be indicative of operations taking place in a UE/AT, such as UE/AT 200, as the UE/AT operates in a normal operating mode with simultaneous sessions with a plurality of wireless communications systems.

UE/AT operations 400 may begin with the UE/AT setting $T_{MaxSessTime}$ to $T_{SMPClose}$ (block 405). According to an embodiment, if the value of $T_{SMPClose}$ is not known a priori, then $T_{MaxSessTime}$ may be configured to a suitable/reasonable value less than $T_{SMPClose}$. In general, $T_{SMPClose}$ may be set to a value ranging from several hours up to 54 hours. Then, while camped in an idle or active state in a first wireless communications system, such as, a LTE wireless communications system, the UE/AT may compare $T_{MaxSessTime}$ to the value of timer $T_{SessionClose}$, for example, by subtracting the two values. The UE/AT may then compare the difference of the two values ($T_{MaxSessTime}$ and $T_{SessionClose}$) with threshold $\Delta_1$ (block 410). If the difference is less than $\Delta_1$ (block 410) and the UE/AT is in an idle state (block 415) then the UE/AT may tune to a second wireless communications system (i.e., an HRPD wireless communications system) and send a KeepAliveRequest message to the AN (block 420). In general, the UE/AT may be considered to be idle if the UE/AT is not actively communicating with another device in a wireless communications system to which it is tuned. If the UE/AT has transmitted information or received information, the UE/AT may be considered to be not idle.

According to an embodiment, after sending the KeepAliveRequest message to the AN (block 420), the UE/AT may perform one of several options. A first option being the UE/AT may explicitly wait for a response message (a KeepAliveResponse message) from the AN. The response message indicating that the second wireless communications system has received the KeepAliveRequest message and has reset $T_{SMPClose}$. In the first option, if the UE/AT does not receive the response message prior to the expiration of a timer started when the KeepAliveRequest message was sent, the UE/AT may resend the KeepAliveRequest message. According to an embodiment, the UE/AT may attempt resending the KeepAliveRequest message until it receives the response message or it has attempted a specified number of resends of the KeepAliveRequest message. The UE/AT may need to wait a specified timeout between each resend.

A second option may be for the UE/AT to send multiple instances of the KeepAliveRequest message upon tuning to the second wireless communications system and not wait to receive a response message. Instead, the UE/AT may immediately switch back to the first wireless communications system. The UE/AT does not wait for an explicit response message from the AN, but increases a likelihood that the AN will receive at least one instance of the KeepAliveRequest message by transmitting a number of KeepAliveRequest messages. The second option reduces a wait time of the UE/AT and the likelihood that the UE/AT will miss transmissions in the first wireless communications system.

According to an embodiment, the option chosen by the UE/AT may be dependent on the threshold (either $\Delta_1$ or $\Delta_2$) that triggers the initiation of the UE/AT initiated keep alive procedure. For example, if the initiation of the UE/AT initiated keep alive procedure is triggered by $\Delta_1$, then the UE/AT may wait for the response message from the AN (i.e., the first option) since the session in the first wireless communications system is in an idle state, while if the initiation of the UE/AT initiated keep alive procedure is triggered by $\Delta_2$, then the UE/AT may not wait for the response message from the AN (i.e., the second option) since the session in the first wireless communications system may not have been in the idle state.

After transmitting the KeepAliveRequest message and performing either the first option or the second option discussed above, the UE/AT may retune back to the LTE wireless communications system and return to block 410 to continue monitoring the value of $T_{MaxSessTime}$ and $T_{SessionClose}$.

If difference is less than $\Delta_1$ (block 410) and the UE/AT is not in an idle state (block 415) then the UE/AT may compare the difference between $T_{MaxSessTime}$ and the value of timer $T_{SessionClose}$ with threshold $\Delta_2$ (block 425). If the difference is less than threshold $\Delta_2$, then the UE/AT may tune to the HRPD wireless communications system and send a KeepAliveRequest message to the AN, regardless of the state of the UE/AT (block 420). After transmitting the KeepAliveRequest message, the UE/AT may retune back to the LTE wireless communications system and return to block 410 to continue monitoring the value of $T_{MaxSessTime}$ and $T_{SessionClose}$. If the difference is not less than threshold $\Delta_2$, then the UE/AT returns to block 415 to wait until the UE/AT is in an idle state or the difference becomes less than threshold $\Delta_2$.

The use of thresholds $\Delta_1$ and $\Delta_2$ (which may be configurable) may allow for a better user experience. The setting of the thresholds so that $\Delta_1 > \Delta_2$, the embodiment allows for the UE/AT to not disrupt an ongoing LTE session until a critical amount of time has elapsed, at which point, the ongoing LTE session may be interrupted. Rather, a window of $(\Delta_1 - \Delta_2)$ time units is provided to allow for the UE/AT to wait until it becomes idle before retuning to the HRPD wireless communications system. If during this $(\Delta_1 - \Delta_2)$ window the UE/AT does not go into an idle state, then when the second condition (block 425) is met (i.e., $(T_{MaxSessTime} - T_{SessionClose}) < \Delta_2$) the UE/AT will retune to HRPD regardless of if the UE/AT is in an active state.

The selection of thresholds $\Delta_1$ and $\Delta_2$ provides a degree of flexibility in controlling the behavior of the UE/AT. Typically thresholds $\Delta_1$ and $\Delta_2$ are set to a percentage of $T_{MaxSessTime}$ (e.g., 25% and 10% respectively). Generally, the larger the values of thresholds $\Delta_1$ and $\Delta_2$ the more conservative the operation becomes. With larger the value of $\Delta_1$ and $\Delta_2$, the UE/AT will initiate the keep alive procedure (i.e., the UE/AT will send a KeepAliveRequest message) rather than wait for a DL/UL transmission exchange with the AN, such as due to a mobility event.

Furthermore, threshold $\Delta_2$ should be selected so that the UE/AT has adequate time to retune to the HRPD wireless communications system and to allow for the successful exchange of KeepAliveRequest/KeepAliveResponse messages to occur (i.e., allow time for scheduling in the HRPD wireless communications system and potentially having the AN retrieve the session from another AN in case of a mobility event).

Finally, if $\Delta_1 = \Delta_2 = \Delta$, the embodiment may be simplified since only a single timer value is needed. However in this case the UE/AT will immediately tune to the HRPD wireless communications system (independent of UE/AT being in an active or idle state) when the condition $(T_{MaxSessTime} - T_{SessionClose}) < \Delta$ is met. The use of a single threshold $(\Delta_1 = \Delta_2 = \Delta)$ may allow for a periodic switching behavior from the UE/AT, wherein the UE/AT retunes to the HRPD wireless communications system after a fixed amount of time (e.g., at periodic intervals, specified times, etc.) has elapsed regardless of UE/AT state.

Figure 5A:
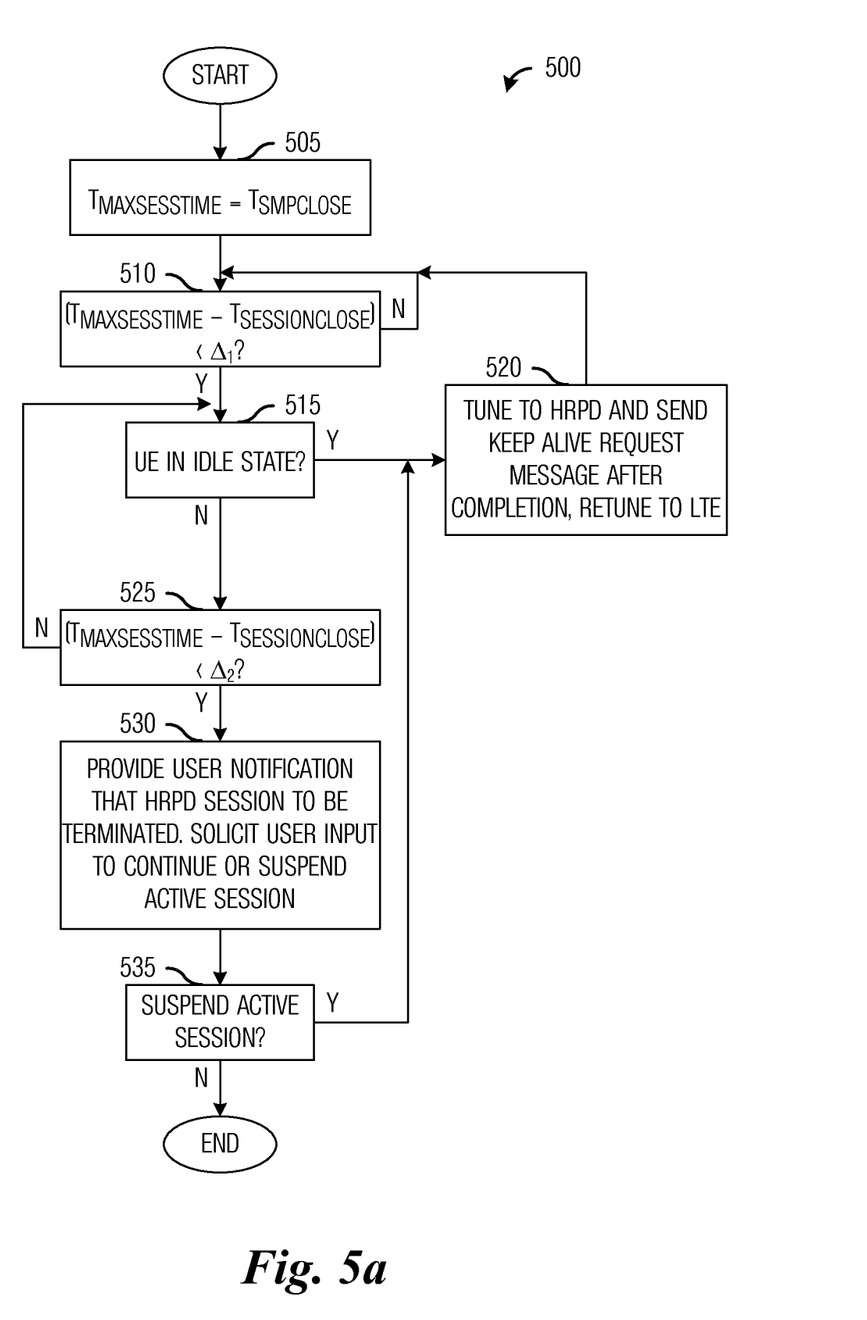
FIG. 5a is a flow diagram of UE/AT operations in supporting a keep alive mechanism with user notification.

FIG. 5a illustrates a flow diagram of UE/AT operations 500 in supporting a keep alive mechanism with user notification. UE/AT operations 500 may be indicative of operations taking place in a UE/AT, such as UE/AT 200, as the UE/AT operates in a normal operating mode with simultaneous sessions with a plurality of wireless communications systems.

UE/AT operations 500 may begin with the UE/AT setting $T_{MaxSessTime}$ to $T_{SMPClose}$ (block 505). According to an embodiment, if the value of $T_{SMPClose}$ is not known a priori, then $T_{MaxSessTime}$ may be configured to a suitable/reasonable value less than $T_{SMPClose}$. In general, $T_{SMPClose}$ may be set to a value ranging from several hours up to 54 hours. Then, while camped in an idle or active state in the LTE wireless communications system, the UE/AT may compare $T_{MaxSessTime}$ to the value of timer $T_{SessionClose}$ for example, by subtracting the two values (block 510). If the difference is less than threshold $\Delta_1$ (block 510) and the UE/AT is in an idle state (block 515) then the UE/AT may tune to the HRPD wireless communications system and send a KeepAliveRequest message to the AN (block 520). In general, the UE/AT may be considered to be idle if the UE/AT is not actively communicating with another device in a wireless communications system to which it is tuned. If the UE/AT has transmitted information or received information, the UE/AT may be considered to be not idle.

According to an embodiment, after sending the KeepAliveRequest message to the AN (block 520), the UE/AT may perform one of several options. A first option being the UE/AT may explicitly wait for a response message (a KeepAliveResponse message) from the AN, and a second option being the UE/AT may not explicitly wait for the response message. A detailed discussion of the two options was provided previously.

After transmitting the KeepAliveRequest message and performing either the first option or the second option discussed above, the UE/AT may retune back to the LTE wireless communications system and return to block 510 to continue monitoring the value of $T_{MaxSessTime}$ and $T_{SessionClose}$.

If difference is less than threshold $\Delta_1$ (block 510) and the UE/AT is not in an idle state (block 515) then the UE/AT may compare the difference with threshold $\Delta_2$ (block 525). If the difference is less than threshold $\Delta_2$, the UE/AT may notify a user of the UE/AT that the HRPD session may be terminated and request user input on continuing with the active session (the session with the LTE wireless communications system, for example) or suspending the active session (block 530).

If the user responds with "suspend active session" or a similar affirmative response (block 535), the UE/AT may then suspend the LTE session and tune to the HRPD wireless communications system and send a KeepAliveRequest message to the AN (block 520). According to an embodiment, in order to suspend the LTE session, the UE/AT may need to send a message containing an indication to the LTE wireless communications system, wherein the indication indicates that the UE/AT is switching to a different access technology, i.e., a different wireless communications system.

After transmitting the KeepAliveRequest message and performing either the first option or the second option discussed above, the UE/AT may retune back to the LTE wireless communications system and return to block 510 to continue monitoring the value of $T_{MaxSessTime}$ and $T_{SessionClose}$. If user responds with "continue with the active session" (block 535), the UE/AT may continue with its LTE session, UE/AT operations 500 may terminate, and the AN may terminate the UE/AT's session with the HRPD wireless communications system due to inactivity.

Figure 5B:
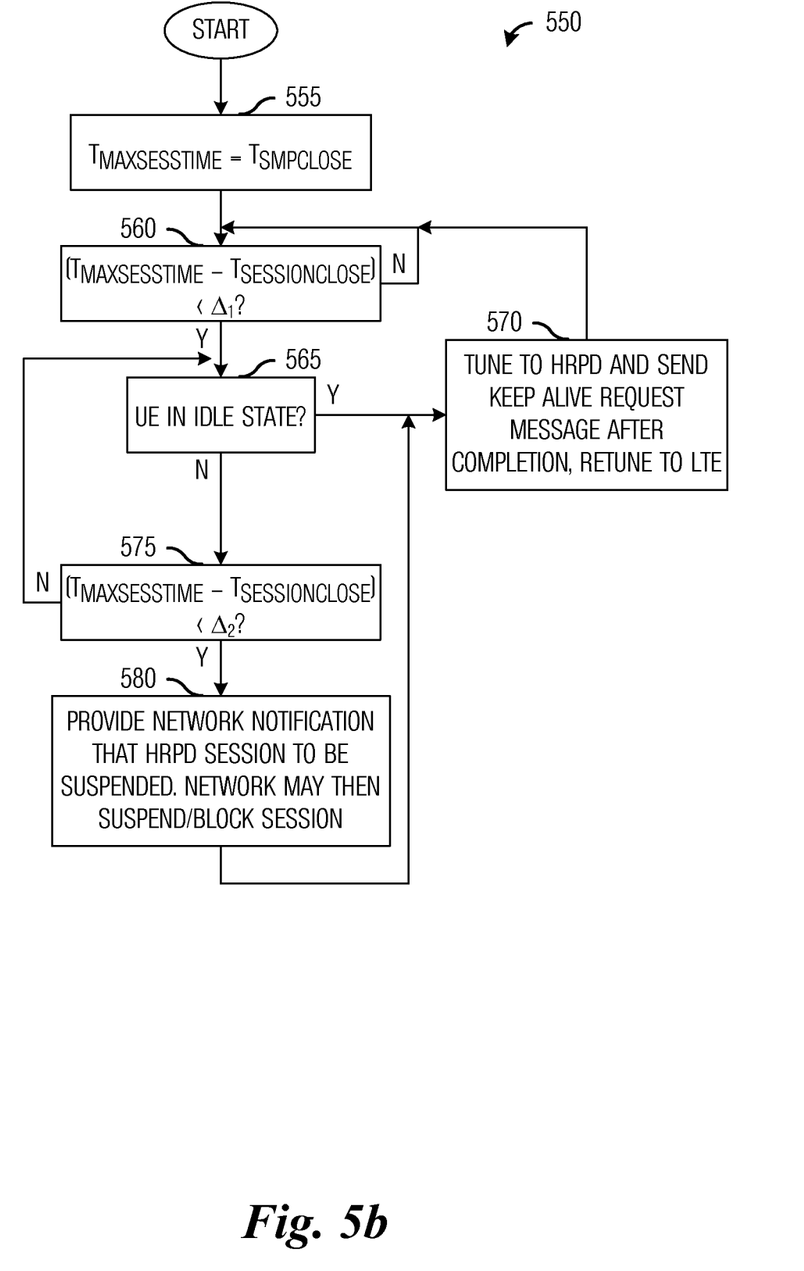
FIG. 5b is a flow diagram of UE/AT operations in supporting a keep alive mechanism with system notification.

FIG. 5b illustrates a flow diagram of UE/AT operations 550 in supporting a keep alive mechanism with system notification. UE/AT operations 550 may be indicative of operations taking place in a UE/AT, such as UE/AT 200, as the UE/AT operates in a normal operating mode with simultaneous sessions with a plurality of wireless communications systems.

UE/AT operations 550 may begin with the UE/AT setting $T_{MaxSessTime}$ to $T_{SMPClose}$ (block 555). According to an embodiment, if the value of $T_{SMPClose}$ is not known a priori, then $T_{MaxSessTime}$ may be configured to a suitable/reasonable value less than $T_{SMPClose}$. In general, $T_{SMPClose}$ may be set to a value ranging from several hours up to 54 hours. Then, while camped in an idle or active state in the LTE wireless communications system, the UE/AT may compare $T_{MaxSessTime}$ to the value of timer $T_{SessionClose}$ for example, by subtracting the two values (block 550). If the difference is less than threshold $\Delta_1$ (block 550) and the UE/AT is in an idle state (block 555) then the UE/AT may tune to the HRPD wireless communications system and send a KeepAliveRequest message to the AN (block 570). In general, the UE/AT may be considered to be idle if the UE/AT is not actively communicating with another device in a wireless communications system to which it is tuned. If the UE/AT has transmitted information or received information, the UE/AT may be considered to be not idle.

According to an embodiment, after sending the KeepAliveRequest message to the AN (block 520), the UE/AT may perform one of several options. A first option being the UE/AT may explicitly wait for a response message (a KeepAliveResponse message) from the AN, and a second option being the UE/AT may not explicitly wait for the response message. A detailed discussion of the two options was provided previously.

After transmitting the KeepAliveRequest message and either the first option or the second option discussed above, the UE/AT may retune back to the LTE wireless communications system and return to block 560 to continue monitoring the value of $T_{MaxSessTime}$ and $T_{SessionClose}$.

If difference is less than threshold $\Delta_1$ (block 560) and the UE/AT is not in an idle state (block 565) then the UE/AT may compare the difference with threshold $\Delta_2$ (block 575). If the difference is less than threshold $\Delta_2$, the UE/AT may notify the LTE wireless communications system that the session between the UE/AT and the LTE wireless communications system will be suspended (by way of a service request message with an indication indicating the switch to a different wireless communications system, for example) and as a result, the LTE wireless communications system may suspend the session and block communications to the UE/AT (block 580). The UE/AT may then tune to the HRPD wireless communications system and send a KeepAliveRequest message to the AN (block 570). After transmitting the KeepAliveRequest message and either the first option or the second option discussed above, the UE/AT may retune back to the LTE wireless communications system and return to block 560 to continue monitoring the value of $T_{MaxSessTime}$ and $T_{SessionClose}$.

Figure 6:
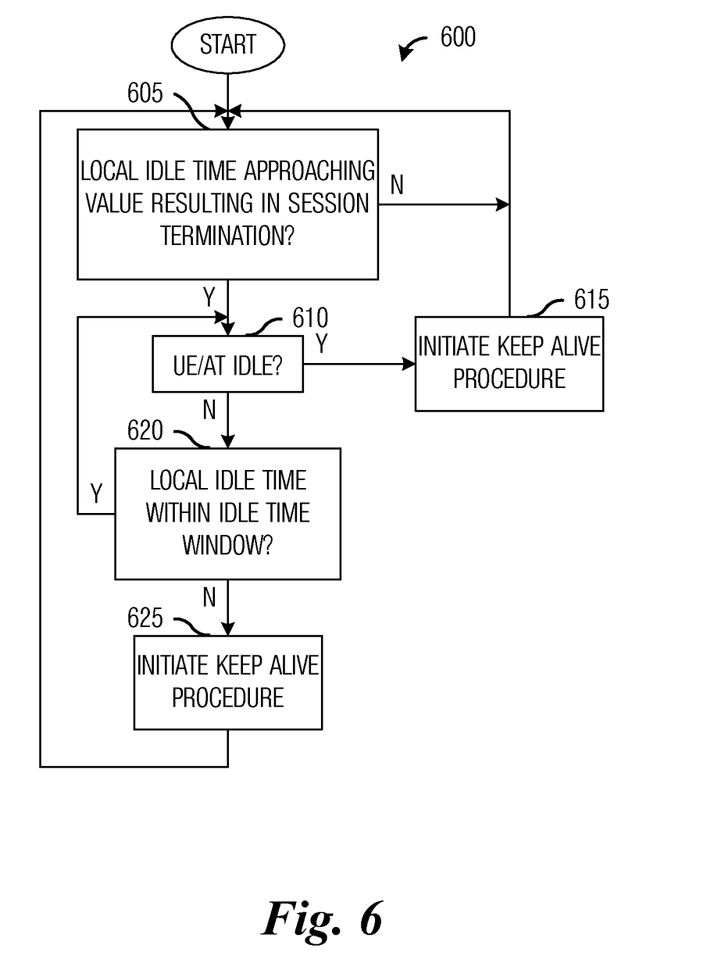
FIG. 6 is a high-level flow diagram of UE/AT operations in supporting a keep alive mechanism.

FIG. 6 illustrates a high-level flow diagram of UE/AT operations 600 in supporting a keep alive mechanism. UE/AT operations 600 may be indicative of operations taking place in a UE/AT, such as UE/AT 200, as the UE/AT operates in a normal operating mode with simultaneous sessions with a plurality of wireless communications systems.

UE/AT operations 600 may begin with the UE/AT, which is operating in a first wireless communications system (the LTE wireless communications system, for example), performing a check to determine if a local idle time timer (for example, $T_{SMPClose}$) is approaching a time value that may result in a termination of a session that the UE/AT has established with a second wireless communications system (the HRPD wireless communications system, for example) (block 605). If the local idle time timer is not approaching the time value, then the UE/AT may continue to monitor the local idle time timer.

If the local idle time timer is approaching the time value, then the UE/AT may perform a check to determine if the UE/AT is in an idle mode (block 610). If the UE/AT is in an idle mode, then the UE/AT may initiate a keep alive procedure to ensure that the session with the second wireless communications system is not terminated (block 615). In general, the UE/AT may be considered to be idle if the UE/AT is not actively communicating with another device in a wireless communications system to which it is tuned. If the UE/AT has transmitted information or received information, the UE/AT may be considered to be not idle.

If the UE/AT is not in an idle mode, then the UE/AT may perform a check to determine if the local idle time timer is within an idle time window (block 620). If the local idle time timer is within the idle time window, the UE/AT may wait to allow for the UE/AT to enter an idle mode (block 610). However, if the local idle time timer is not within the idle time window, then the UE/AT may go ahead and initiate a UE/AT initiated keep alive procedure to ensure that the session with the second wireless communications system is not terminated (block 625). The UE/AT may then return to block 605 to monitor the local idle time timer.

In an alternative embodiment, rather than automatically initiating a keep alive procedure if the local time timer is not within the idle time window, the UE/AT may give a user of the UE/AT an option of continuing with its current session in the first wireless communications system or suspending the current session to initiate the keep alive procedure.

In another alternative embodiment, rather than prompting the user for a response to the option of continuing with its current session in the first wireless communications system or suspending the current session to initiate the keep alive procedure, the UE/AT notifies the LTE wireless communications system that the UE/AT will suspend its session with the LTE wireless communications system in order to keep alive its session with the HRPD wireless communications system and that the LTE wireless communications system should block transmissions to the UE/AT.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operation, the method comprising:

establishing simultaneous communications sessions in first and second wireless communications networks;

determining if a communications device is within an idle time window, wherein the idle time window is specified by a first time and a second time, and wherein the second time is greater than or equal to the first time;

determining if the communications device is in an idle state in the first wireless communications system;

when an elapsed time since a last transmission by the communications device in the second wireless communications system is less than the first time, not initiating a keep alive procedure in the second wireless communications system;

when the communications device is within the idle time window and when the communications device is in the idle state in the first wireless communications system, initiating the keep alive procedure in the second wireless communications system;

when the communications device is within the idle time window and when the communications device is not in the idle state in the first wireless communications system, not initiating the keep alive procedure in the second wireless communications system; and when the elapsed time since the last transmission by the communications device in the second communications system is greater than the second time, initiating the keep alive procedure in the second wireless communications system.

2. The method of claim 1, wherein determining if the communications device is within the idle time window comprises determining if the elapsed time since the last transmission by the communications device occurred within the first time and the second time.

3. The method of claim 2, wherein the elapsed time is maintained by a timer that is set to a specified value each time the communications device makes an outgoing transmission or receives an incoming transmission.

4. The method of claim 2, wherein the first time and the second time specify a start time and a stop time of the idle time window, respectively.

5. The method of claim 1, wherein initiating the keep alive procedure comprises:
tuning the communications device to the second communications system, wherein the communications device was tuned to the first communications system prior to tuning to the second communications system; and
transmitting a message to an access network of the second communications system.

6. The method of claim 5, wherein initiating the keep alive procedure further comprises:
receiving a response message from the access network; and
resetting the elapsed time since the last transmission by the communications device.

7. The method of claim 1, wherein the communications device is tuned to the first communications system, and wherein determining if the communications device is in the idle state comprises determining if the communications device is communicating with any other device in the first communications system.

8. A method for communications device operation, the method comprising:
(a) establishing simultaneous communications sessions in current and alternate wireless communications networks;
(b) updating a timer that maintains an elapsed time since a last transmission by a communications device;
(c) determining if the communications device is operating in a first priority state;
(d) when the communications device is operating in the first priority state and when the communications device is in an idle state in the current wireless communications network, initiating a keep alive procedure in the alternate wireless communications network;
(e) when the communications device is operating in the first priority state and when the communications device is not in an idle state in the current wireless communications network, not initiating the keep alive procedure in the alternate wireless communications network;
(f) determining if the communications device is operating in a second priority state; and
(g) when the communications device is operating in the second priority state, initiating the keep alive procedure in the alternate wireless communications network.

9. The method of claim 8, further comprising repeating (b), (c), (d), (e), (f) and (g) when the communications device is not operating in the first priority state or the second priority state.

10. The method of claim 8, wherein initiating the keep alive procedure comprises:
tuning the communications device to the alternate communications system, wherein the communications device was tuned to the current communications system prior to tuning to the alternate communications system; and
transmitting a message to an access network of the alternate communications system.

11. The method of claim 10, wherein initiating the keep alive procedure further comprises:
receiving a response message from the access network; and
resetting the timer.

12. The method of claim 10, wherein transmitting the message to the access network of the alternate communications system comprises transmitting multiple messages to the access network of the alternate communications system, and wherein initiating the keep alive procedure further comprises:
retuning the communications device to the current communications system; and
resetting the timer.

13. The method of claim 8, wherein determining if the communications device is operating in the first priority state comprises determining if a value of the timer meets a first criteria.

14. The method of claim 13, wherein determining if the value of the timer meets the first criteria comprises determining if a difference between a maximum session time and the value is less than a first threshold.

15. The method of claim 14, wherein determining if the communications device is operating in the second priority state comprises determining if the value meets a second criteria.

16. The method of claim 15, wherein determining if the value meets the second criteria comprises determining if the difference between the maximum session time and the value is less than a second threshold.

17. The method of claim 16, wherein the second threshold is smaller than the first threshold.

18. The method of claim 17, further comprising:
when the communications device is not operating in the first or second priority states, not initiating the keep alive procedure in the alternate wireless communications network.

19. The method of claim 18, wherein the communications device is not operating in the first or second priority states when the difference between the maximum session time and the value is greater than the first threshold.

20. The method of claim 8, wherein when the communications device is operating in the second priority state further comprises prompting a user of the communications device for permission to proceed with the keep alive procedure, and wherein initiating the keep alive procedure occurs only when the user grants permission to proceed.

21. The method of claim 8, wherein when the communications device is operating in the second priority state further comprises notifying the current communications system that an active application communicating with the current communications system will be suspended.

22. A communications device comprising:
- a receiver to be coupled to an antenna, the receiver configured to receive signals detected by the antenna;
- a transmitter to be coupled to the antenna, the transmitter configured to transmit signals using the antenna;
- a timer configured to measure elapsed time; and
- a controller coupled to the receiver, to the transmitter, and to the timer, the controller configured to
  - establish simultaneous communications sessions in current and alternate wireless communications networks, and
  - initiate a communications device initiated keep alive procedure in accordance with the elapsed time measured by the timer, wherein the procedure comprises
    - when the elapsed time is less than a first time, not initiate a keep alive procedure in the alternate wireless communications system,
    - when the communications device is greater than the first time and less than a second time, and when the communications device is in the idle state in the current wireless communications system, initiate the keep alive procedure in the alternate wireless communications system,
    - when the communications device is greater than the first time and less than the second time, and when the communications device is not in the idle state in the current wireless communications system, not initiate the keep alive procedure in the alternate wireless communications system, and
    - when the elapsed time greater than the second time, initiate the keep alive procedure in the alternate wireless communications system.

23. The communications device of claim 22, wherein the controller comprises:
- a timer control unit coupled to the timer, the timer control unit configured to configure the timer, and to control the timer;
- a transmission detect unit coupled to the transmitter, to the receiver, and to the timer control unit, the transmission detect unit configured to detect a transmission or reception made by the communications device in the alternate communications system;
- a threshold unit coupled to the timer, the threshold unit configured to specify first and second threshold values in accordance with the first and second times, respectively;
- a comparison unit coupled to the threshold unit and the timer, the comparison unit configured to compare the elapsed time measured by the timer and the first and second threshold values; and
- a switching unit coupled to the comparison unit, to the transmitter, and to the receiver, the switching unit configured to tune the communications device from the current communications system to the alternate communications system in accordance with an output of the comparison unit.

24. The communications device of claim 23, wherein the controller further comprises a user/network notification unit coupled to the comparison unit, the user/network notification unit configured to prompt a user of the communications device for permission to initiate the communications device initiated keep alive procedure.

25. The communications device of claim 24, wherein the user/network notification unit is further configured to notify the current communications system of the communications device initiate keep alive procedure.

* * * * *